Patented May 29, 1951

2,554,592

UNITED STATES PATENT OFFICE 2,554,592

PROCESS OF PRODUCING HIGH MOLECULAR POLYAMIDES

Jiří Procházka, Prague, Czechoslovakia, assignor to Bata, narodni podnik, Zlin, Czechoslovakia No Drawing. Application February 25, 1947, Serial No. 730,758. In Germany September 15, 1941

Section 1, Public Law 690, August 8, 1946
Patent expires September 15, 1961

4 Claims. (Cl. 260—78)

The present invention relates to a process of producing high molecular polyamides spinnable from the melted mass and whose polymethylene chain between the single groups —CO.NH— contains 5 atoms of carbon.

The process of producing of high molecular polyamides spinnable from the melted mass whose polymethylene chain between the single groups —CO.NH— or —NH.CO consists of 5 atoms of carbon, is well known. Hitherto this process has been carried out in two ways: As starting material has been employed either the free 6-aminocaproic acid or its ester along with a lower volatile alcohol, or the 6-caprolactam, derived from this acid. In the first case it was necessary to accomplish the polycondensation in a high vacuum in order to obtain a polyamide of a sufficiently high molecular weight which may be spun from the melted mass to strong threads. The heating lasted rather long, the last remainders of the condensation water being extruded in a special apparatus under pressures lower than 1 mm. Hg (compare e. g. The Journal of the American Chemical Society, LIV., 1566–1569, and the U. S. A. Patent No. 2,071,253, Example 4).

When, on the contrary, 6-caprolactam has been used as a starting material, it has been necessary to promote the polymerisation by a long heating—extending over more than 60 hours—to higher temperatures under pressure (in closed tubes) in presence of catalysts, e. g. of a small quantity of water, acid, hydrochloride of the 6-aminocaproic acid, etc. The lactam chain of 7 members is very steady and splits so uneasily that even the inventor of the polyamides, W. H. Carothers, believed for a long time that it is impossible to split them.

The present invention is based on a surprising discovery that both processes going on—per se—very uneasily, may be extraordinarily facilitated and accelerated if they are carried out simultaneously in one phase, e. i. if a mixture of the 6-aminocaproic acid and 6-caprolactam is being heated to temperatures ranging from 150 to 300° C. The reaction takes place in few hours even in an open vessel, therefore without using a reduced or a high pressure, and without catalysts. A polymerisation catalyst of the lactam is here really represented by the condensation water which in the course of the condensation is gradually being freed of the 6-aminocaproic acid. It could not be expected to obtain the same or a better result by simply mixing both starting substances, known per se, and by heating them for e. g. 5 hours in an open vessel without any catalyst, than when heating e. g. for 60 hours the sole lactam in a closed tube with addition of a catalyst, or when heating, likewise for a much longer time, the sole 6-aminocaproic acid in a very high vacuum. When using a reaction vessel with a narrow opening, it is not at all necessary to protect the melted mass by means of an inert gas, since the stream, developing in the course of the polycondensation of the aminoacid, fills completely the vessel and extrudes the air out of it. Hereby an absolutely pure polyamide is obtained since no heterogeneous catalyst is being added which, itself or by its decomposition products, could soil the finished product.

The unexpectedly favourable course of the process may be perhaps explained by the fact that during the polycondensation of the aminoacid a certain, though later perhaps small amount of water is steadily being freed within the reaction mixture. This water splits, at a higher temperature, the lactam chain and enables a smooth polymerisation of the lactam. By adding water, an equally favourable result is not obtained, not even in a closed tube, since the water does not build a homogeneous phase with the melted mass. Therefore in a closed tube, according to the process known e. g. from the Italian Patent No. 373,977, the water is acting chiefly as steam on the surface of the melted mass, while in the process according to the present invention, it is acting in the whole mass "in statu nascendi."

Although it is not quite indispensable to protect, under any circumstances, the reaction mixture, by means of an inert gas from oxidation, it is nevertheless possible to use in some cases this measure, known per se, even in the process according to the present invention and to combine it e. g. with the agitation of the reaction mixture in such a way that an inert gas is being conducted through a pipe to the bottom of the vessel.

The obtained polyamide shows all typical properties of the known polyamides, its intrinsic viscosity amounting, according to the time of heating, to 0.5–1.1, and is very well suitable for the production of artificial threads and the like.

*Example*

80 parts of the 6-caprolactam and 20 parts of the pure 6-aminocaproic acid have been heated in a glass open vessel with a narrow opening for 6 hours to temperatures ranging from 200 to 250° C. In the melted state the obtained polyamide had an intrinsic viscosity of 0.65 and, after having been cooled, built a hard, glasslike and tough mass from which it was possible, after a new melting, to spin very strong threads, which, in cool state, could be drawn to a multiple of the original length.

Instead of the 6-aminocaproic acid it is possible to use even its low molecular products of polycondensation, e. i. to take as starting material this acid, already partially pre-treated by heating to higher temperatures.

Manifestly, variations may be resorted to and features may be modified or used without others within the scope of the appended claims.

Having now fully described my invention, I claim:

1. The process of producing high molecular polyamides having five carbon atoms in the polymethylene chain separating the two amido groups, which comprises mixing 6-aminocaproic acid with 6-caprolactam as the sole reactants and continuously heating the resulting mixture and maintaining it in molten condition in an open vessel at a temperature ranging from 150° to 300° C. until a spinnable product is obtained from the molten mass.

2. The process of producing high molecular polyamides having five carbon atoms in the polymethylene chain separating the two amido groups, which comprises mixing about 20% 6-aminocaproic acid with about 80% 6-caprolactam as the sole reactants and continuously heating the resulting mixture and maintaining it in molten condition in an open vessel for a period of several hours at a temperature ranging from 150° to 300° C. until a spinnable product is obtained from the molten mass.

3. The process of producing high molecular polyamides having five carbon atoms in the polymethylene chain separating the two amido groups, which comprises mixing 6-aminocaproic acid with 6-caprolactam as the sole reactants; heating the resulting mixture and maintaining it in molten condition in an open vessel at a temperature ranging from 150° to 300° C. until a mass of high viscosity is obtained; then cooling the mass; thereafter re-melting the cooled mass; spinning the same; and recovering a spun product.

4. The process of producing high molecular polyamides having five carbon atoms in the polymethylene chain separating the two amido groups, which comprises mixing 20 parts of 6-aminocaproic acid with 80 parts of 6-caprolactam as the sole reactants; heating the resulting mixture and maintaining it in molten condition for a period of several hours at a temperature ranging from 200° to 250° C. until a mass having an intrinsic viscosity of 0.65 is obtained; then cooling the molten mass to form a relatively hard glass-like mass; thereafter re-melting the glass-like mass; spinning the same; and recovering a spun product.

JIŘÍ PROCHÁZKA.

REFERENCES CITED

The following references are of record in the file of this patent:

UNITED STATES PATENTS

| Number | Name | Date |
|---|---|---|
| 2,071,253 | Carothers | Feb. 16, 1937 |

FOREIGN PATENTS

| Number | Country | Date |
|---|---|---|
| 68,885 | Norway | Feb. 12, 1945 |
| 242,616 | Switzerland | Oct. 16, 1946 |